United States Patent
Roche

(10) Patent No.: US 6,314,947 B1
(45) Date of Patent: Nov. 13, 2001

(54) FUEL DELIVERY SYSTEM

(75) Inventor: Ronald H. Roche, Cass City, MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/417,939

(22) Filed: Oct. 13, 1999

(51) Int. Cl.[7] .............................. F02M 21/02; F02B 43/00
(52) U.S. Cl. ........................ 123/525; 123/527; 123/497
(58) Field of Search .................................. 123/525, 527, 123/497, 179.17, 456

(56) References Cited

U.S. PATENT DOCUMENTS

| | | | |
|---|---|---|---|
| 4,369,751 | * 1/1983 | Batchelor et al. | 123/672 |
| 4,450,821 | * 5/1984 | Venning et al. | 123/525 |
| 4,453,523 | * 6/1984 | Poehlman | 123/527 |
| 5,127,230 | * 7/1992 | Neeser et al. | 62/7 |
| 5,219,277 | 6/1993 | Tuckey . | |
| 5,257,916 | 11/1993 | Tuckey . | |
| 5,315,973 | * 5/1994 | Hill et al. | 123/304 |
| 5,623,907 | * 4/1997 | Cotton et al. | 123/456 |
| 5,755,211 | * 5/1998 | Koch | 123/525 |
| 5,857,448 | * 1/1999 | Ofner et al. | 123/525 |
| 6,161,525 | * 12/2000 | Ficht | 123/495 |

* cited by examiner

*Primary Examiner*—Carl S. Miller
(74) *Attorney, Agent, or Firm*—Reising, Ethington, Barnes, Kisselle, Learman & McCulloch, P.C.

(57) ABSTRACT

A fuel delivery system which selectively controls two pressure sources to deliver fuel from a tank to the engine for consumption by the engine. The fuel system has a pair of fuel supply passages through which fuel is discharged from the fuel tank to a main fuel supply line for delivery to the engine. One fuel passage communicates with an outlet of an electric fuel pump disposed within the fuel tank. The second fuel passage permits fuel to flow out of the fuel tank into the main fuel supply line independently of the fuel pump within the tank. Preferably, a valve is disposed in the second fuel passage to selectively permit fuel flow through the second fuel passage. The fuel system also has a controller which selectively provides electric power to the fuel pump so that the fuel pump in the fuel tank operates only when it is needed to discharge fuel from the tank.

14 Claims, 1 Drawing Sheet

FUEL DELIVERY SYSTEM

FIELD OF THE INVENTION

This invention relates generally to vehicle fuel systems and more particularly, to a fuel delivery system utilizing two pressure sources for the delivery of fuel.

BACKGROUND OF THE INVENTION

Vehicles in use today may be powered by a wide-range of fuels such as leaded and unleaded gasoline, diesel fuel, methane and propane, to name a few. Whatever fuel is used to power a vehicle, the vehicle fuel system is specifically designed to continually supply fuel for the satisfactory operation of the engine. The fuel systems for the different fuels may vary from one another to account for the different properties of the various fuels.

For instance, some gasoline fuel systems, such as those used to supply fuel to marine engines, utilize a low pressure fuel pump disposed within the fuel tank to deliver fuel to a high pressure fuel pump downstream of the fuel tank which further increases the pressure of the fuel before delivery to the engine. Indeed, in some fuel delivery systems more than two fuel pumps may be used to provide fuel to the engine. Typically, at least one of the fuel pumps is electrically powered and thus, increases the power demand on the vehicle electrical system. Further, under at least some vehicle operating conditions, fewer than all of the fuel pumps in the fuel system may be needed to supply the engine fuel demand, and thus, operating all of the fuel pumps provides an unnecessary, excess fuel supply.

In propane fuel systems, the in-tank pressure of the propane is sufficient, at most operating temperatures, to discharge a pressurized propane supply from the tank into the engine for the satisfactory operation of the engine. However, the pressure of propane decreases dramatically at low temperatures and at about −40° F. for some grades of propane, the pressure will be about 0 PSI. Thus, during these very low pressure conditions within the propane tank the supply of propane to the engine may be severely reduced if not terminated thereby adversely affecting the performance of the engine.

SUMMARY OF THE INVENTION

A fuel delivery system is provided which selectively controls two pressure sources to deliver fuel from a tank to the engine for consumption by the engine. The fuel system has a pair of fuel supply passages through which fuel is discharged from the fuel tank to a main fuel supply line for delivery to the engine. One fuel passage communicates with an outlet of a fuel pump disposed within the fuel tank. The second fuel passage permits fuel to flow out of the fuel tank into the main fuel supply line independently of the fuel pump within the tank. Preferably, a valve is disposed in the second fuel passage to selectively permit fuel flow through the second fuel passage. The fuel system also has a controller which selectively provides power to the fuel pump so that the fuel pump in the fuel tank operates only when it is needed to discharge fuel from the tank.

In one embodiment, a propane fuel system utilizes a pump within a propane tank to discharge propane under pressure to the engine when the pressure within the tank is insufficient to provide an adequate supply of propane to the engine. Desirably, a temperature sensor in the propane tank communicates with the controller so that when the temperature within the tank is below a predetermined threshold temperature, which corresponds to a threshold pressure within the tank, the controller may activate the pump to supplement or provide entirely the flow of propane out of the tank for delivery to the engine. Conversely, when the propane tank temperature is above the threshold temperature, the pressure within the tank is sufficient to supply propane at an adequate rate and pressure to the engine independently of the pump. Thus, the power supplied to the pump is terminated by the controller to turn the pump off. This reduces the electrical power demand of the fuel system and extends the in-service life of the pump.

In another embodiment, a high pressure fuel pump downstream of the fuel tank discharges pressurized fuel for use by the engine and is the primary source of fuel to the engine. A second pump disposed within the vehicle fuel tank may be used to provide fuel from the fuel tank to the high pressure fuel pump, and is preferably only used during initial start-up of the engine to reduce the time required to prime the fuel system with fuel. Thereafter, the fuel pump may be deactivated with the primary fuel pump drawing fuel directly from the fuel tank for delivery to the engine. The primary fuel pump may be of substantially any kind including mechanical or electrical fuel pumps. The secondary, priming fuel pump is preferably electrical and is selectively activated by a controller which selectively provides electrical power to the pump. Desirably, the secondary fuel pump may be used to facilitate starting, warming up and initial operation of the engine and thereafter deactivated to reduce the electrical draw of the fuel system and to extend the in-service life of the secondary fuel pump.

Objects, features and advantages of this invention include providing a fuel system which efficiently supplies fuel to an engine through two pressure sources, reduces the electrical demand of the fuel system, extends the life of an in-tank fuel pump, efficiently and selectively operates the in-tank fuel pump, ensures an adequate fuel supply to the engine, improves the priming and initial operation of a vehicle fuel system, may be used with substantially any type of fuel including, but not limited to propane, diesel and gasoline fuels, is of relatively simple design and economical manufacture and assembly, is reliable, durable and has a long and useful in-service life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
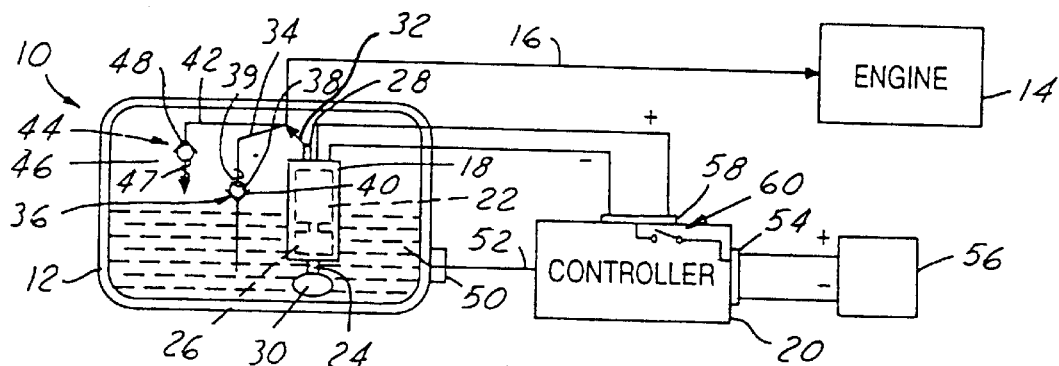
FIG. 1 is a diagrammatic view of a fuel delivery system according to a first embodiment of the present invention.

Referring in more detail to the drawings, FIG. 1 illustrates a fuel delivery system 10 which provides propane under pressure from a fuel tank 12 to an engine 14. Propane is discharged from the tank 12 to a main fuel supply line 16 by either a fuel pump 18 within the tank 12 or by the internal fluid pressure within the tank 12. The fuel pump 18 preferably only operates when the internal fluid pressure within the fuel tank 12 is insufficient to provide a satisfactory fuel flow rate and/or pressure to the engine 14. A controller 20 responsive to low pressure conditions within the tank 12 controls the operation of the pump 18.

The in-tank pump 18 is preferably driven by an electric motor 22 and may be of substantially any kind suitable to draw propane into an inlet 24, increase the pressure of the propane with a pumping mechanism 26, and to discharge propane under pressure from its outlet 28 for delivery to the engine 14. A filter 30 preferably surrounds the pump inlet 24 to remove impurities from the fuel before it is drawn into the pump 18.

A first fluid passage 32 communicates the outlet 28 of the fuel pump 18 with the main fuel supply line 16 through which propane is delivered to the engine 14. A second fluid passage 34 opens into the tank 12 and communicates fluid within the tank 12 with the main fuel supply line 16. A check valve 36 is preferably disposed in the second fluid passage 34 to permit the flow of fuel from the tank 12 to the main fuel supply line 16 when the pressure in the tank 12 is above a threshold pressure sufficient to open the valve 36. The valve 36 prevents the reverse flow of fluid from the main fuel supply line 16 to the fuel tank 12. Preferably, the valve 36 comprises a valve head 38 yieldably biased by a spring 39 onto a valve seat 40 as in a conventional check valve. Desirably, the fuel pump 18 also has either an internal check valve or a check valve downstream of its outlet 28 to prevent the reverse flow of fluid from the main fuel supply line 16 through the fuel pump 18. A bypass fluid passage 42 may also be provided in the tank 12 and communicating the main fuel supply line 16 with the interior of the tank 12 to selectively bypass propane fuel in the main fuel supply line 16 to the tank 12. A check valve 44 associated with the bypass fluid passage 42 prevents the flow of fuel from the tank 12 to the main fuel supply line 16 and permits the flow in the opposite direction from the main fuel supply line 16 to the tank 12 when the pressure in the main fuel supply line 16 is above a predetermined threshold pressure. This check valve 44 is preferably also of generally conventional construction having a valve head 46 yieldably biased by a spring 47 onto a valve seat 48.

A temperature sensor 50 carried by the tank 12 is responsive to the fuel temperature in the tank 12 and is communicated with the controller 20 to provide a signal to the controller 20 indicative of the fuel temperature in the tank 12. The controller 20 has a first input 52 which receives the signal from the temperature sensor 50, a second input 54 which receives positive and negative connections from a power supply 56 such as a battery and an output 58 through which the power supply is selectively communicated with the electric motor 22 of the fuel pump 18. An internal switch 60 (shown diagrammatically) of the controller 20 is responsive to the signal from the temperature sensor 50 to selectively provide electric power from the power supply 56 to the fuel pump 18.

Figure 3:
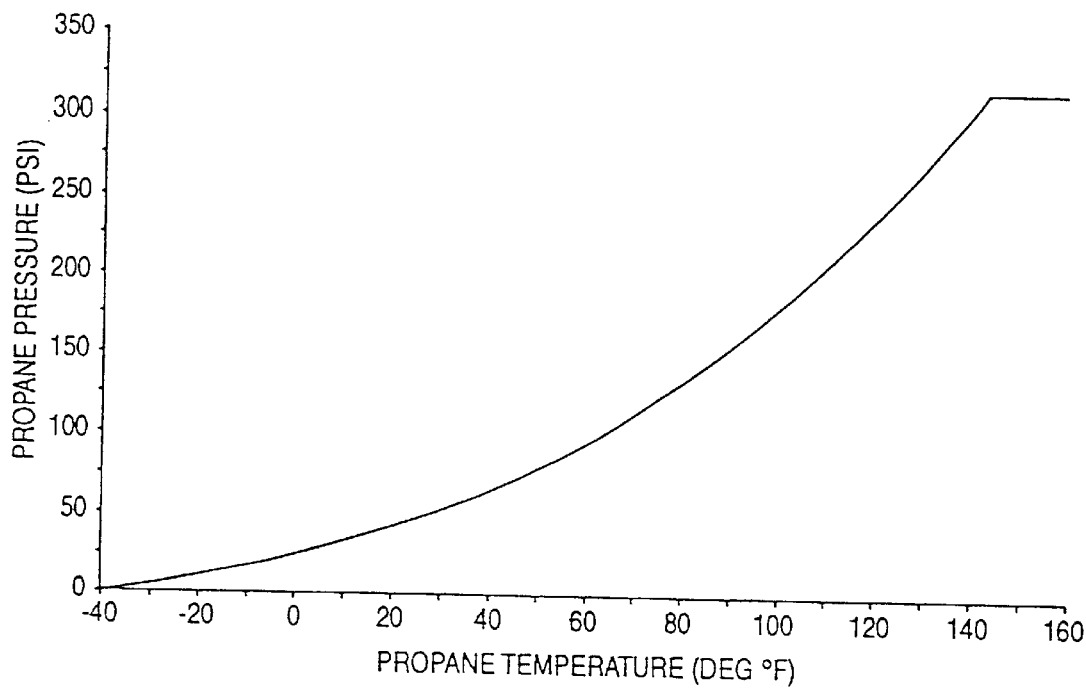
FIG. 3 is a graph of propane pressure versus temperature.

As best shown in FIG. 3, the pressure of propane varies greatly depending on its temperature. The graph of FIG. 3 shows the pressure versus temperature for HD-5 motor grade propane which is at about 0 psig at −40° F. and over 300 psig at 140° F. Typically, propane tank regulations require that a relief valve be installed In the tank to vent to the atmosphere propane within the tank 12 when the pressure in the tank 12 exceeds 312 psig.

At low operating temperatures, the internal fluid pressure within the tank 12 may be extremely low and insufficient to supply the desired flow rate and/or pressure of propane fuel to the engine 14. Thus, when the temperature within the tank 12 is below a pre-determined threshold temperature, the controller 20 responds to the signal presented to it by the temperature sensor 50 and provides the electrical power to the fuel pump 18 to turn on or energize the fuel pump so that it discharges propane under pressure to the engine 14. When the temperature within the tank 12 exceeds the threshold temperature, the controller 20 prevents the application of electrical power to the fuel pump 18 so that the fuel pump 18 is off and the internal fluid pressure within the tank 12 is the pressure source which provides propane under pressure to the engine 14 through the second fluid passage 34 and main fuel supply line 16.

In one propane fuel system 10 for a fuel injected automotive vehicle engine the check valve 36 opens at about 40 psig, the check valve 44 opens at about 45 psig, the electric pump when operating supplies fuel at its outlet 28 at a pressure of about 45 psig, and the temperature sensor 50 and controller 20 permit the electric pump 18 to be energized to supply fuel to the engine 14 whenever the propane fuel temperature is below about 30° F.

Second Embodiment

Figure 2:
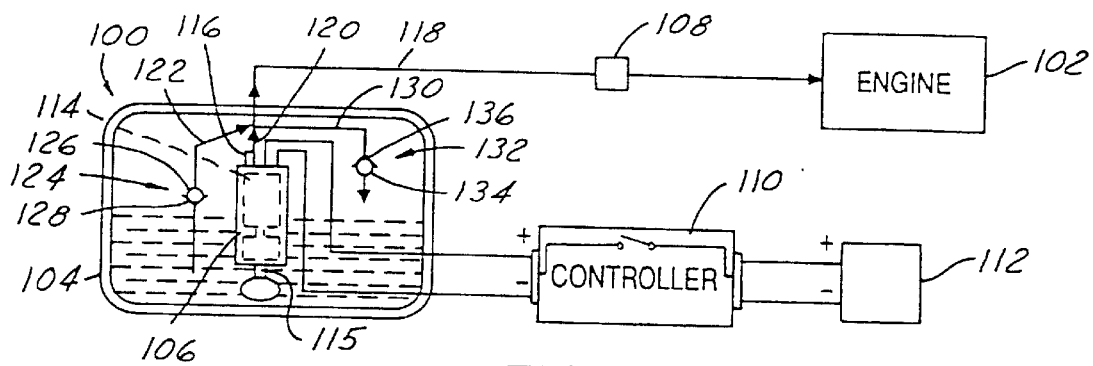
FIG. 2 is a diagrammatic view of a fuel delivery system according to a second embodiment of the present invention.

As shown in FIG. 2, a fuel delivery system 100 according to the present invention may also be used to deliver hydrocarbon liquid fuels such as diesel fuel or unleaded gasoline to an engine 102 such as a marine engine. The fuel delivery system 100 has a fuel tank 104 constructed to contain a supply of fuel, a first, fuel pump 106 disposed within the fuel tank 104 and a second, high pressure fuel pump 108 which discharges fuel under pressure to the engine 102. Desirably, the second, high pressure fuel pump 108 may be disposed outside of the fuel tank 104 and may receive all fuel discharged from the fuel tank 104 to increase the pressure of this fuel for delivery to fuel injectors of the engine 102. A controller 110 selectively communicates a power supply 112 such as a battery with an electric motor 114 which drives the first fuel pump 106 to selectively operate the first fuel pump 106.

The first fuel pump 106 may be of substantially any kind suitable to draw fuel through an inlet 115 and discharge fuel under pressure through an outlet 116 for delivery to a main fuel line 118 and engine 102. For example fuel pump 106 may be a positive displacement pump such as a gear rotor fuel pump of the type disclosed in U.S. Pat. No. 5,219,277 or a regenerative or turbine fuel pump such the type disclosed in U.S. Pat. No. 5,257,916. The second or high pressure fuel pump 108 is generally a mechanical fuel pump of substantially any kind suitable for delivering pressurized fuel at a sufficient flow rate and pressure to the engine 102.

A first fluid passage 120 in the fuel tank 104 communicates the outlet 116 of the first fuel pump 106 with the main fuel supply line 118. Preferably, a second fluid passage 122 in the fuel tank 104 communicates the fuel within the fuel tank 104 with the main fuel supply line 118 and second or high pressure fuel pump 108. A check valve 124 associated with the second fuel passage 122 prevents the flow of fuel from the main fuel supply line 118 into the fuel tank 104 and permits the flow of fuel from the fuel tank 104 into the main fuel supply line 118 when a sufficient pressure differential exists across the check valve 124. The check valve 124 preferably comprises a valve head 126 yieldably biased, such as by a spring 127, onto a valve seat 128. Desirably, the pressure drop created by the second fuel pump 108 is sufficient to open the check valve 124 to draw fuel directly to the second fuel pump 108 through the second fuel passage 122 and main fuel supply line 118 independently of the first fuel pump 106. Preferably and optionally, a third or bypass fuel passage 130 in the fuel tank 104 communicates the main fuel supply line 118 with the fuel tank 104 when the pressure in the main fuel supply line 118 is above a threshold pressure. A check valve 132 associated with the bypass fuel passage 130 prevents the flow of fuel from the fuel tank 104 to the main fuel supply line 118. The check valve 132 in the bypass fuel passage 130 preferably comprises a valve head 134 yieldably biased, such as by a spring 135, onto a valve seat 136, with the biasing force calibrated to control the pressure at which fuel is bypassed to the fuel tank 104 and thus the maximum pressure of fuel supplied by the electric pump 106 to the second pump 108.

This second embodiment fuel delivery system 100 could be used for a marine engine with the first fuel pump 106 being a low pressure fuel pump turned on by the controller 110 only during initial start-up of the engine to facilitate quickly priming the fuel passages 120, 122, 130, second fuel pump 108 and remainder of the system 100 with liquid fuel. Thus, the engine does not need to crank to pump fuel via fuel pump 108 for the initial priming of the fuel system. Thereafter, the controller 110 may prevent the application of electrical power to the electric motor 114 of the first fuel pump 106 thereby turning the first fuel pump 106 off to reduce the electrical draw of the system. With the first fuel pump 106 off, fuel delivery to the engine 102 occurs solely through the second fuel passage 122 and main fuel passage 118 as drawn by the second fuel pump 108 and thereafter discharged by the second fuel pump 108 to the engine 102. The fuel pump 106 may be an electric fuel pump or a mechanical fuel pump driven by the engine 102 such as a mechanically actuated diaphragm fuel pump.

In the marine engine application, the check valve 124 at the second fuel passage 122 is preferably spring loaded and acts as an anti-siphon valve to prevent the fuel tank 104 from being drained by a siphon created in the main fuel passage 118 when the engine is not running. This fuel delivery system 100 may also be useful in many other applications including industrial engines and automotive, to name a few.

In one fuel delivery system 100 for an engine, the check valve 124 opens at about 1 psig or less, the check valve 132 opens at about 47 psig, the electric pump when operating supplies fuel at its outlet 116 at a pressure of about 47 psig, and controller 20 permits the electric pump 18 to be energized to supply fuel to the engine 14 for a duration of about 30 seconds when the engine is initially started to prime the fuel delivery system 100.

In either embodiment, the fuel delivery system 10, 100 has a first fuel pressure source selectively operated by a controller 20, 110 and a second fuel pressure source which, under at least some operating conditions, can cause the discharge of sufficient fuel from the tank 12, 104 for delivery to the engine 14, 102 to satisfy the engine's fuel demand. The selective operation of the first fuel source can be used to either supplement the second fuel pressure source when it is insufficient to satisfy the engine's fuel demand, or may be used to prime the fuel delivery system upon start-up or initial warming up of the engine. In any event, selective operation of the first fuel pressure source, which is preferably an electric motor driven pump 18, 106, reduces the electrical demand of the fuel delivery system and extends the in-service life of the first fuel pressure source. Further, the fuel delivery system facilitates the use of propane fuel systems in cold weather conditions.

What is claimed is:

1. A fuel delivery system comprising:
   a fuel tank constructed to contain a supply of fuel;
   an electric fuel pump disposed within the fuel tank and having an inlet through which fuel is drawn from within the fuel tank, an outlet through which fuel is discharged under pressure for delivery to an engine, and the electric fuel pump being switchable between on and off states where, when on, the electric fuel pump discharges fuel from its outlet and, when off, the electric pump does not discharge fuel from its outlet;
   a first fluid line in communication with the outlet of the electric fuel pump and through which fuel is delivered exteriorly of the tank to the engine;
   a second fluid line communicating with the first fluid line downstream of the outlet of the electric pump and with the interior of the fuel tank for supplying fuel from the fuel tank through the first fluid line to the engine independently of the electric fuel pump;
   a check valve in the second fluid line having a valve head yieldably biased against a valve seat to a closed position to prevent the flow of fuel through the second line into the fuel tank when the electric fuel pump is operating to supply fuel through the first fluid line to the engine and is displaceable from the valve seat to an open position to permit fuel to flow from the tank through the second fluid line into the first fluid line and to the operating engine when the electric pump is not operating and the pressure in the fuel tank is greater than the pressure in the second fluid line; and
   a controller communicating with the electric fuel pump and operable to change the state of the electric fuel pump between its on an off states so that when the output is needed to supply fuel to the engine, the controller turns the electric fuel pump on and when the output of the electric pump is not needed the controller turns the electric fuel pump off and fuel flows from the fuel tank to the operating engine through the second fluid line, check valve and first fluid line to the operating engine.

2. A fuel delivery system, comprising:
   a fuel tank constructed to contain a supply of propane fuel;
   an electric fuel pump disposed within the fuel tank having an inlet through which fuel is drawn from the fuel tank, an outlet through which fuel is discharged under pressure for delivery to an engine and being switchable between on and off states wherein, when on, the electric fuel pump discharges fuel from its outlet and when off, the electric fuel pump does not discharge fuel from its outlet;
   a second pressure source of propane within the tank capable under at least some operating conditions of causing propane fuel to be discharged from the fuel tank under pressure for delivery to the engine; and
   a controller communicating with the electric fuel pump and operable to change the state of the fuel pump between its on and off states whereby, when the output of the fuel pump is needed, the controller turns the electric fuel pump on and when the output of the electric fuel pump is not needed, the controller turns the electric fuel pump off and the second pressure source delivers propane fuel to the engine without any output from the electric fuel pump.

3. The fuel delivery system of claim 1 which also comprises a temperature sensor responsive to the temperature of propane within the fuel tank and communicating with the controller to send a signal to the controller indicative of the temperature of propane within the fuel tank and wherein the controller is constructed to permit the electric pump to be reenergized when the temperature within the fuel tank is below a predetermined threshold value and to prohibit the electric pump from being energized when the temperature within the fuel tank is above the threshold value.

4. The fuel delivery system of claim 1 which also comprises a first fluid line in communication with the electric fuel pump outlet and through which fuel is delivered to the engine, a second fluid line in communication with the interior of the fuel tank, the first fluid line downstream of the electric fuel pump and the second pressure source so that the second pressure source may cause fuel to be discharged from the fuel tank for delivery to the engine independently of the electric fuel pump.

5. The fuel delivery system of claim 4 which also comprises a check valve associated with the second fluid line and constructed to permit fuel flow from the fuel tank into the second fluid line and to prevent reverse fuel flow from the second fluid line to the fuel tank.

6. The fuel delivery system of claim 5 wherein the check valve comprises a valve head yieldably biased against a valve seat and displaceable from the valve seat when the pressure in the fuel tank creates a force acting on the valve head which is greater than the force tending to close the valve head onto the valve seat.

7. The fuel delivery system of claim 1 which also comprises a second fuel pump disposed downstream of the fuel tank and having an inlet in communication with the first fluid line and an outlet through which fuel is discharged under pressure for delivery to the engine.

8. The fuel delivery system of claim 7 wherein the second fuel pump draws fuel from the fuel tank through the second fluid line for delivery to the engine.

9. The fuel delivery system of claim 4 which also comprises a bypass fluid line in communication at one end with the first fluid line downstream of the electric fuel pump outlet and at its other end with the interior of the fuel tank, and a valve associated with the bypass fluid line constructed to permit fuel flow from the bypass fluid line to the fuel tank when the pressure differential across the valve head is above a predetermined threshold value.

10. The fuel delivery system of claim 9 wherein the check valve of the bypass fluid line has a valve head yieldably biased to a closed position engaged with a valve seat to prevent fuel flow from the fuel tank to the bypass fluid line with such biasing force calibrated to prevent fuel flow from the bypass fluid line to the fuel tank when the pressure differential across the valve head is below the threshold value.

11. The fuel delivery system of claim 7 wherein the controller turns the electric fuel pump on when the engine is initially started to facilitate priming the fluid lines and second fuel pump and after a predetermined duration of time, the controller turns off the electric fuel pump.

12. The fuel delivery system of claim 1 wherein the electric fuel pump is driven by an electric motor and the controller selectively provides electrical power to the electric motor to selectively change the electric fuel pump between its on and off states.

13. The fuel delivery system of claim 5 wherein the controller comprises a switch adapted to turn the electric motor on when in a first state and to turn the electric motor off when in a second state.

14. The fuel delivery system of claim 9 wherein the valve associated with the bypass fluid line is disposed in the fuel tank.

* * * * *

UNITED STATES PATENT AND TRADEMARK OFFICE
CERTIFICATE OF CORRECTION

PATENT NO. : 6,314,947 B1
DATED : November 13, 2001
INVENTOR(S) : Ronald H. Roche It is certified that error appears in the above-identified patent and that said Letters Patent is hereby corrected as shown below:

Column 6,
Line 60, delete "claim 1" and insert -- claim 2 --.

Column 7,
Line 4, delete "claim 1" and insert -- claim 2 --.

Signed and Sealed this

Fourteenth Day of May, 2002

Attest:

Attesting Officer

JAMES E. ROGAN
Director of the United States Patent and Trademark Office